US009497082B2

(12) United States Patent  
Cutler et al.

(10) Patent No.: US 9,497,082 B2  
(45) Date of Patent: Nov. 15, 2016

(54) RULES ENGINE EVALUATION FOR POLICY DECISIONS

(75) Inventors: Kevin Scott Cutler, Carp (CA); Allen Robinson, Ottawa (CA)

(73) Assignee: Alcatel Lucent, Boulogne-Billancourt (FR)

( * ) Notice: Subject to any disclaimer, the term of this patent is extended or adjusted under 35 U.S.C. 154(b) by 1015 days.

(21) Appl. No.: 13/251,643

(22) Filed: Oct. 3, 2011

(65) Prior Publication Data

US 2013/0086237 A1 Apr. 4, 2013

(51) Int. Cl.
| | |
|---|---|
| *G06F 15/16* | (2006.01) |
| *H04L 12/24* | (2006.01) |
| *H04L 12/26* | (2006.01) |
| *H04W 8/18* | (2009.01) |
| *H04W 24/10* | (2009.01) |
| *H04M 15/00* | (2006.01) |
| *H04W 4/24* | (2009.01) |

(52) U.S. Cl.  
CPC .......... *H04L 41/0893* (2013.01); *H04L 43/06* (2013.01); *H04M 15/66* (2013.01); *H04M 15/80* (2013.01); *H04W 4/24* (2013.01); *H04W 8/18* (2013.01); *H04W 24/10* (2013.01)

(58) Field of Classification Search  
None  
See application file for complete search history.

(56) References Cited

U.S. PATENT DOCUMENTS

| | | | |
|---|---|---|---|
| 8,345,676 B2 * | 1/2013 | Lialiamou | H04L 12/14 370/252 |
| 2002/0124067 A1 | 9/2002 | Parupudi et al. | |
| 2006/0050711 A1 | 3/2006 | Lialiamou et al. | |

(Continued)

FOREIGN PATENT DOCUMENTS

| | | |
|---|---|---|
| EP | 1026867 A2 | 8/2000 |
| EP | 1484886 A2 | 12/2004 |

(Continued)

OTHER PUBLICATIONS

International Search Report for PCT/CA2012/050639 dated Dec. 4, 2012.

(Continued)

*Primary Examiner* — Natisha Cox  
(74) *Attorney, Agent, or Firm* — Kramer & Amado, P.C.

(57) ABSTRACT

Various exemplary embodiments relate to a method performed by a network policy node. The method may include: translating a policy into a plurality of rule objects, the policy including an applicability condition and one or more action rules; generating a selection rule table based on the applicability condition of one or more policies; generating an action rule table from the one or more action rules of an applicable policy, an action rule including an action condition and an action path; determining a set of applicable policies by evaluating the selection rule table using a rules engine; and selecting an action path by evaluating the action rule table using the rules engine. Various exemplary embodiments relate to a network policy node including a scanner that generates rules objects and rule tables based on one or more policies, a context information storage, and a rules engine that evaluates rule tables.

21 Claims, 5 Drawing Sheets

(56) References Cited

U.S. PATENT DOCUMENTS

| | | | |
|---|---|---|---|
| 2006/0294219 A1* | 12/2006 | Ogawa | H04L 41/0893 709/224 |
| 2007/0150936 A1* | 6/2007 | Maes | H04L 67/10 726/1 |
| 2009/0228953 A1* | 9/2009 | Hu | G06F 15/17343 726/1 |
| 2009/0228954 A1* | 9/2009 | Hu | H04L 63/102 726/1 |
| 2009/0254494 A1 | 10/2009 | Li et al. | |
| 2010/0093336 A1* | 4/2010 | Hogan | H04L 41/0893 455/422.1 |
| 2011/0264726 A1* | 10/2011 | Zabawskyj | H04L 12/14 709/203 |
| 2011/0276530 A1* | 11/2011 | Cutler | G06Q 10/06 706/47 |
| 2011/0282996 A1* | 11/2011 | Zahavi | H04L 65/1063 709/226 |

FOREIGN PATENT DOCUMENTS

| | | |
|---|---|---|
| JP | 2002016599 A | 1/2002 |
| JP | 2003513522 A1 | 4/2003 |
| JP | 2004080524 A | 11/2004 |
| JP | 2009525689 A | 9/2007 |
| JP | 2009260986 A | 5/2009 |
| WO | 2010052030 A1 | 5/2010 |
| WO | 2011101063 | 8/2011 |

OTHER PUBLICATIONS

"Extended Search Report for EP 12839099 dated Jun. 18, 2015".
First Office Action for Korean Patent Application No. 2014-7008716 dated Nov. 26, 2014.

* cited by examiner

| POLICY | | |
|---|---|---|
| 310 | ATTRIBUTES | |
| 311 | NAME | 4G DATA |
| 312 | POLICY TYPE | MANAGED USAGE MANAGEMENT POLICY |
| 313 | PRIORITY | 10 |
| 314 | QUOTA TYPE | TOTAL |
| 315 | QUOTA | 2GB |
| 316 | RECURRENCE | MONTHLY |
| 317 | VALIDITY PERIOD | N/A |
| 318 | SY MANAGEMENT | NO |
| 320 | APPLICABILITY RULES | |
| 322 | CONDITION | ACTION |
| 326 | ACCESS=4G | ACTION=4G DATA |
| 330 | RATING RULES | |
| 332 | CONDITION | ACTION |
| 336 | LOCAL | RATING=100 |
| 337 | ROAMING | RATING=200 |
| 338 | INTERNATIONAL | RATING=300 |
| 340 | THRESHOLD RULES | |
| 342 | CONDITION | ACTION |
| 346 | 100% THRESHOLD | ACTION=TERMINATE |
| 347 | 90% THRESHOLD | ACTION=DOWNGRADE |
| 348 | 50% THRESHOLD | ACTION=NOTIFY |
| 349 | 0% THRESHOLD | ACTION=NOTIFY |

FIG. 3

POLICY SELECTION RULE TABLE

| CONDITION | ACTION |
|---|---|
| ACCESS=4G? & 4G DATA= SUBSCRIBER POLICY? | POLICY=4G DATA |
| DEVICE=iPHONE & iPHONE= SUBSCRIBER POLICY? | POLICY=iPHONE |
| DEVICE=ANDROID & ANDROID= SUBSCRIBER POLICY? | POLICY=ANDROID |
| ACCESS=DSL & DSL= SUBSCRIBER POLICY? | POLICY=DSL |
| DEVICE=WAP & WAP= SUBSCRIBER POLICY? | POLICY=WAP |
| DEVICE=ANY & DATA= SUBSCRIBER POLICY? | POLICY=DATA |
| DEVICE=ANY & OVERAGE= SUBSCRIBER POLICY? | POLICY=OVERAGE |
|  |  |

FIG. 4

RULES ENGINE EVALUATION FOR POLICY DECISIONS

TECHNICAL FIELD

Various exemplary embodiments disclosed herein relate generally to communications networks, and particularly to policy management of communications networks.

BACKGROUND

Communications networks provide network services to numerous subscribers. The number of subscribers accessing a network may easily reach into the millions. A network service provider must manage the network to meet service agreements with each subscriber, maintain security, manage network resources, and correctly charge each subscriber. As the number of subscribers grows, there is demand for network management solutions that efficiently manage network services while allowing flexibility among different subscribers and different contexts.

In view of the foregoing, it would be desirable to provide a network policy node for efficiently managing a subscriber network. In particular, it would be desirable to provide a node that may quickly make policy decisions for individual subscribers or network components while taking into account varying contexts.

SUMMARY

In light of the present need for a network policy node for efficiently managing a subscriber network, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method performed by a network policy node. The method may include: translating a policy into a plurality of rule objects, the policy including an applicability condition and one or more action rules; generating a selection rule table based on the applicability condition of one or more policies; generating an action rule table from the one or more action rules of an applicable policy, an action rule including an action condition and an action path; determining a set of applicable policies by evaluating the selection rule table using a rules engine to compare the applicability conditions and context information; and selecting an action path by evaluating the action rule table using the rules engine to compare action conditions and the context information.

In various alternative embodiments, the one or more action rules may include one or more threshold rules, and the step of selecting an action path may include: generating a threshold rule table based on the one or more threshold rules; and selecting an action path by evaluating the threshold rule table using the rules engine to compare a threshold condition and a system parameter.

In various alternative embodiments, the one or more action rules may include one or more rating rules, and the method may further include: generating a rating selection table based on the one or more rating rules; selecting a rating factor by evaluating the rating selection table using the rules engine; and multiplying an input by the rating factor.

In various alternative embodiments, the policy is a usage management policy, and the method further includes: receiving a usage report including a subscriber's usage of a network, wherein the subscriber's usage is the input value; determining a system parameter based on the input value; generating a threshold rule table based on one or more threshold rules of the applicable policy; and selecting an action path by evaluating the threshold rule table using the rules engine to compare a threshold condition and the system parameter.

In various alternative embodiments the method further includes selecting a policy from among the applicable policies according to a priority of the applicable policies.

In various alternative embodiments, the method may further include: assigning at least one policy to a subscriber, and the step of determining a set of applicable policies may include determining whether a policy has been assigned to a subscriber.

In various alternative embodiments, the one or more policies may be one or more usage management policies and the one or more action paths may include session actions and flow actions.

Various exemplary embodiments relate to a tangible and non-transitory machine-readable storage medium encoded with instructions thereon for execution by a network element of a telecommunication network. The instructions may configure the operation of the network element to perform the above described method.

Various exemplary embodiments relate to a network policy node including: a scanner configured to generate rules objects based on one or more policies, and generate rule tables including one or more rule objects; a context information storage configured to store context information; and a rules engine configured to evaluate a selection rule table based on the context information and return a set of applicable policies, and evaluate an action rule table based on the context information and return an action path.

In various alternative embodiments, the one or more policies include a priority, and the network policy node further includes a policy selector configured to select a policy from among the applicable policies based on the priority.

In various alternative embodiments, the network policy further includes a rule object memory configured to maintain an active set of rule objects.

In various alternative embodiments, the network policy node further includes: a first interface configured to receive network context information; and a second interface configured to send and receive subscriber context information.

In various alternative embodiments, the policies are usage management policies including applicability rules, a quota, rating selection rules, and threshold rules. The scanner may be further configured to generate a rating selection table and the rules engine may be further configured to evaluate the rating selection table to select a rating factor. The network policy node may further include an action manager configured to arm another network node with usage reporting requirements and perform network management actions.

It should be apparent that, in this manner, various exemplary embodiments enable a network policy node and method for efficiently managing a subscriber network. In particular, the node may quickly make policy decisions for individual subscribers or network components while taking into account varying contexts by using a rules engine to select an applicable policy and evaluate action tables.

BRIEF DESCRIPTION OF THE DRAWINGS

In order to better understand various exemplary embodiments, reference is made to the accompanying drawings, wherein:

FIG. 3 illustrates an exemplary usage management policy;

FIG. 4 illustrates an exemplary rule table; and

DETAILED DESCRIPTION

Figure 1:
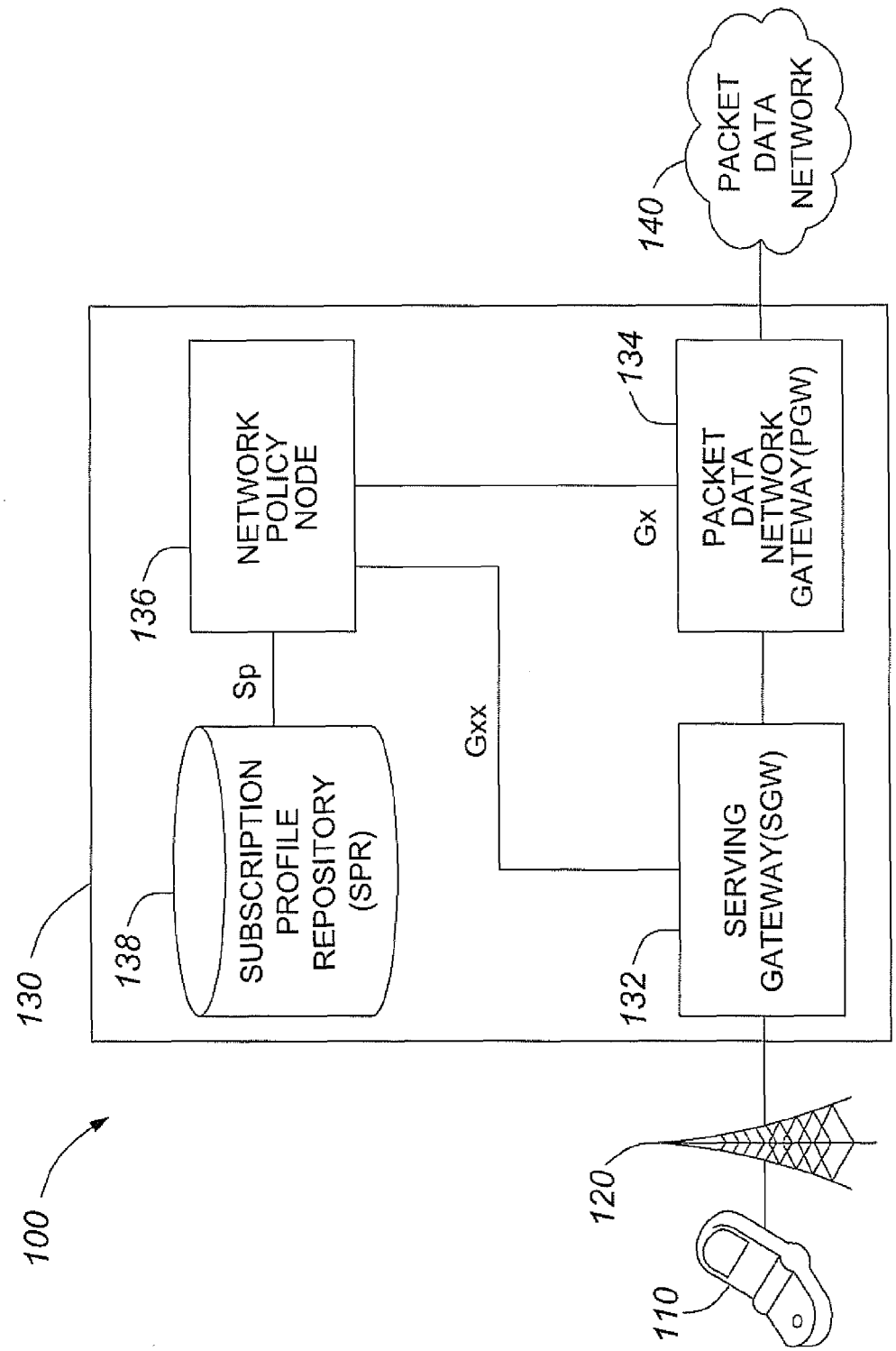
FIG. 1 illustrates an exemplary subscriber network for providing various data services.

Recent trends in subscriber network usage patterns require advanced policy management. In general, subscribers and providers desire network management that allows dynamic policies that change to match rapidly changing contexts. Subscribers may use multiple devices to access a service provider's network and may not want to maintain a separate account for each device. Multiple technologies converge in modern user devices allowing network access through different paths from the same device, which may require separate policies for monitoring and controlling usage. Users and subscribers may want service plans that allow users to access the network with any device via any path and accurately reflect the cost of such usage on the network.

A rules based approach allows selection of an appropriate policy and implementation of the policy using a single rules engine. Policies and rule objects may be re-used for multiple subscribers in similar contexts. A rules based approach is particularly applicable to subscriber usage metering, network resource management, network security, and network traffic management.

Referring now to the drawings, in which like numerals refer to like components or steps, there are disclosed broad aspects of various exemplary embodiments.

FIG. 1 illustrates an exemplary subscriber network 100 for providing various data services. Exemplary subscriber network 100 may be a communications network, such as an LTE or 4G mobile communications network, for providing access to various services. The subscriber network 100 may include user equipment 110, base station 120, evolved packet core (EPC) 130, and packet data network 140.

User equipment 110 may be a device that communicates with packet data network 140 for providing an end-user with a data service. Such data service may include, for example, voice communication, text messaging, multimedia streaming, and Internet access. More specifically, in various exemplary embodiments, user equipment 110 is a personal or laptop computer, wireless email device, cell phone, television set-top box, or any other device capable of communicating with other devices via EPC 130.

Base station 120 may be a device that enables communication between user equipment 110 and EPC 130. For example, base station 120 may be a base transceiver station such as an evolved nodeB (eNodeB) as defined by 3GPP standards. Thus, base station 120 may be a device that communicates with user equipment 110 via a first medium, such as radio waves, and communicates with EPC 130 via a second medium, such as Ethernet cable. Base station 120 may be in direct communication with EPC 130 or may communicate via a number of intermediate nodes (not shown). In various embodiments, multiple base stations (not shown) may be present to provide mobility to user equipment 110. Note that in various alternative embodiments, user equipment 110 may communicate directly with EPC 130. In such embodiments, base station 120 may not be present.

Evolved packet core (EPC) 130 may be a device or association of devices that provides user equipment 110 with gateway access to packet data network 140. EPC 130 may further charge a subscriber for use of provided data services and ensure that particular quality of experience (QoE) standards are met. Thus, EPC 130 may be implemented, at least in part, according to the 3GPP TS 29.212, 29.213, and 29.214 standards. Accordingly, EPC 130 may include a serving gateway (SGW) 132, a packet data network gateway (PGW) 134, a network policy node 136, and a subscription profile repository (SPR) 138.

Serving gateway (SGW) 132 may be a device that provides gateway access to the EPC 130 to an end user of network 100. SGW 132 may be the first device within the EPC 130 that receives packets sent by user equipment 110. SGW 132 may forward such packets toward PGW 134. SGW 132 may perform a number of functions such as, for example, managing mobility of user equipment 110 between multiple base stations (not shown) and enforcing particular quality of service (QoS) characteristics for each flow being served. In various implementations, such as those implementing the proxy mobile IP (PMIP) standard, SGW 132 may include a bearer binding and event reporting function (BBERF). In various exemplary embodiments, EPC 130 may include multiple SGWs (not shown) and each SGW may communicate with multiple base stations (not shown).

Packet data network gateway (PGW) 134 may be a device that provides gateway access to packet data network 140 to an end user of network 100. PGW 134 may be the final device within the EPC 130 that receives packets sent by user equipment 110 toward packet data network 140 via SGW 132. PGW 134 may include a policy and charging enforcement function (PCEF) that enforces policy and charging control (PCC) rules for each service data flow (SDF). Therefore, PGW 134 may be a policy and charging enforcement node (PCEN). PGW 134 may include a number of additional features such as, for example, packet filtering, deep packet inspection, and subscriber charging support. For example, PGW 134 may provide subscriber usage information to network policy node 136 according to armed metering rules determined by network policy node 136. It should be noted that while exemplary network 100 corresponds to one particular implementation of long term evolution (LTE), many variations may exist. For example, SGW 132 may not be present, PGW 134 may not be present, and/or the functions of SGW 132 and PGW 134 may be consolidated into a single device or spread across multiple additional devices.

Network policy node 136 may make policy decisions based on network information. In various exemplary embodiments, network policy node 136 may be a policy and charging rules node (PCRN). For example, network policy node 136 may make subscriber metering policy decisions based on subscriber policies, subscriber information, and network usage information. Network policy node 136 may communicate with SGW 132 and PGW 134 via a Gxx and a Gx interface, respectively. Network policy node 136 may arm SGW 132 and/or PGW 134 with usage reporting rules for desired subscriber usage information. Network policy node 136 may generate and/or modify PCC rules to control how SOW 132 and PGW 134 treat subscriber traffic.

In the process of making policy decisions, network policy node 136 may make use of one or more rule objects to select applicable policies and actions, the details of which will be described below with reference to FIGS. 2-5. Network policy node 136 may evaluate rule tables to generate result sets. Network policy node 136 may generate rule objects including rule tables from policies configured by a network operator. Upon establishment of a subscriber session or updates to the session, network policy node 136 may evaluate a policy selection table to determine a result set including applicable policies. Network policy node 136 may further select one of the applicable policies to apply to the session. The selected policy may include static attributes and additional dynamic rule tables. Network policy node 136 may evaluate the dynamic rule tables to determine appropriate actions for managing a subscriber session in compliance with the selected policy.

Subscription profile repository (SPR) 138 may be a device that stores information related to subscribers to the subscriber network 100. Thus, SPR 138 may include a machine-readable storage medium such as read-only memory (ROM), random-access memory (RAM), magnetic disk storage media, optical storage media, flash-memory devices, and/or similar storage media. SPR 138 may be a component of network policy node 136 or may constitute an independent node within EPC 130. Data stored by SPR 138 may include an identifier of each subscriber and indications of subscription information for each subscriber such as, for example, subscriber category, subscriber policies or plans, account balances, bandwidth limits, charging parameters, and subscriber priority. SPR 138 may also maintain a record of current subscriber usage according to one or more counters such as, for example, data volume (uplink, downlink, or total), time, or credits for each policy.

Packet data network 140 may be a network (e.g., the Internet or another network of communications devices) for providing data communications between user equipment 110 and other devices connected to packet data network 140. Packet data network 140 may further provide, for example, phone and/or Internet service to various user devices in communication with packet data network 140.

Figure 2:
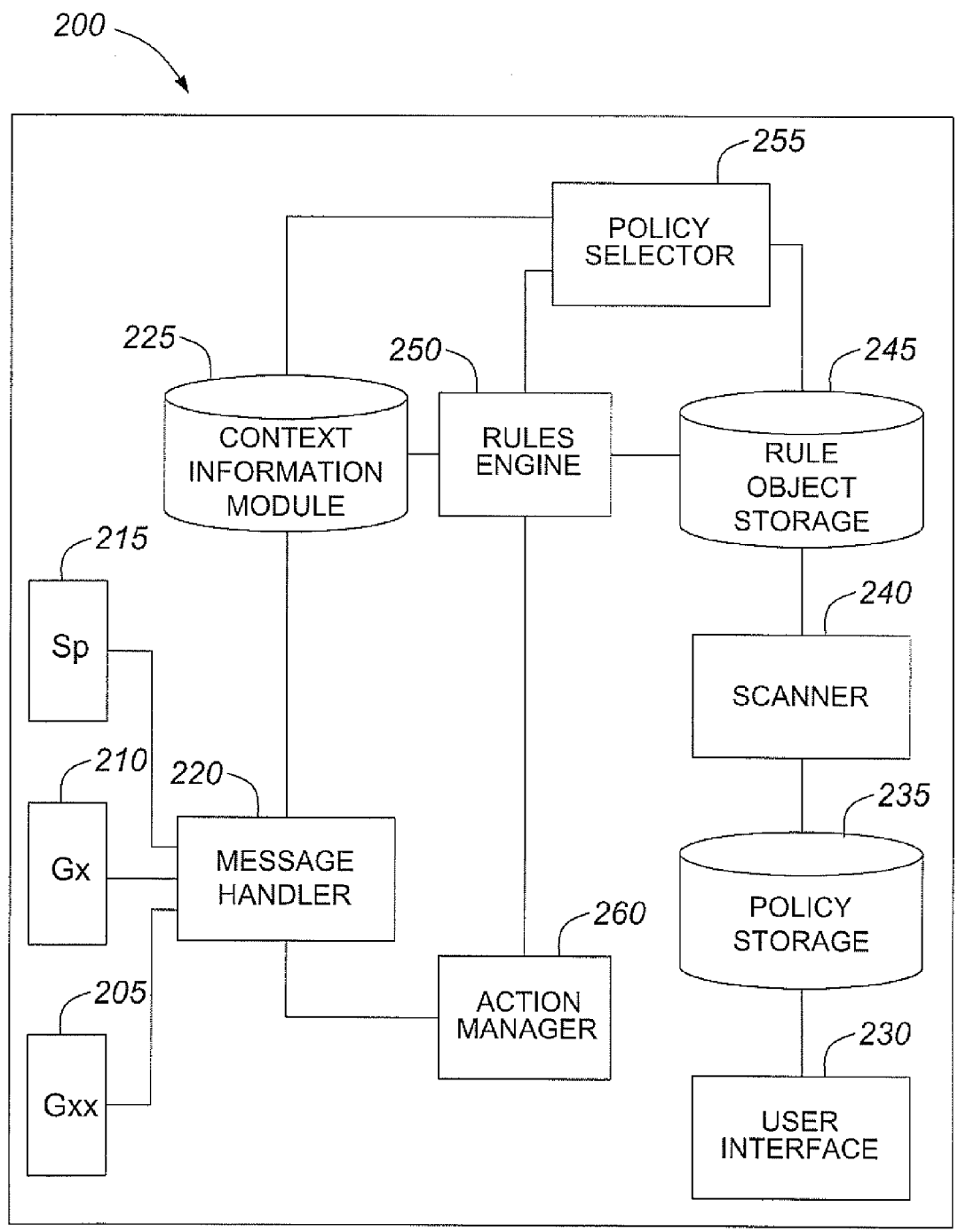
FIG. 2 illustrates an exemplary network policy node.

FIG. 2 illustrates an exemplary network policy node 136. Network policy node 136 may include Gxx interface 205, Gx interface 210, Sp interface 215, message handler 220, context information module 225, user interface 230, policy storage 235, scanner 240, rule object storage 245, rules engine 250, policy selector 255, and action manager 260.

Gxx interface 205 may be an interface comprising hardware and/or executable instructions encoded on a machine-readable storage medium configured to communicate with a SGW such as SGW 132. Such communication may be implemented according to the 3GPP TS 29.212. Thus, Gxx interface 205 may receive requests for QoS rules and transmit QoS rules for installation. Gxx interface 205 may further receive UE-originated application requests, session requests, and event notifications in the form of a credit control request (CCR).

Gx interface 210 may be an interface comprising hardware and/or executable instructions encoded on a machine-readable storage medium configured to communicate with a PGW such as PGW 134. Such communication may be implemented according to the 3GPP TS 29.212. Thus, Gx interface 210 may receive requests for PCC rules and transmit PCC rules for installation. Gx interface 210 may further receive UE-originated application requests, session requests, and event notifications in the form of a CCR.

Sp interface 215 may be an interface comprising hardware and/or executable instructions encoded on a machine-readable storage medium configured to communicate with SPR 138. For example, Sp interface 215 may receive subscriber information in the form of a subscriber profile. Sp interface 215 may also send subscriber information or updated subscriber profiles to SPR 138. Sp interface 215 may not be included if SPR 138 is an integrated component of network policy node 136.

Message handler 220 may include hardware and/or executable instructions on a machine-readable storage medium configured to process usage monitoring messages sent and/or received via Gxx interface 205, Gx interface 210, and/or Sp interface 215. For example, message handler 220 may receive usage accounting messages from PGW 134. After network policy node 136 makes a policy decision, message handler 220 may construct and transmit a message over Gxx interface 205, Gx interface 210, and/or Sp interface 215 to notify other nodes as to the result of the policy decision. For example, if node 136 creates a new PCC rule according to an applicable policy, it may construct a reauthorization request (RAR) message to push the new PCC rule to an appropriate PGW. Message handler 220 may provide context information from the message to rules engine 250, either directly or via context information module 225. Messages received by message handler 220 may trigger invocation of a rule table to either select a new policy or determine whether an action should be taken.

Context information module 225 may include hardware and/or executable instructions on a machine-readable storage medium configured to provide various context information to rules engine 250. Context information may include various system parameters. For example, context information module 225 may store information carried by a received message. Context information module 225 may further store previously received and/or transmitted messages associated with a subscriber, session, and/or service data flow. Context information module 225 may further access information stored elsewhere such as, for example, subscriber information stored in an SPR such as SPR 138.

User interface 230 may include hardware and/or executable instructions on a machine-readable storage medium configured to provide a network operator with access to network policy node 136. User interface 230 may receive input from a network operator and may include hardware such as, for example, a keyboard and/or mouse. User interface 230 may also display information as output to the network operator and may include, for example, a monitor. A network operator may access policy storage 235 via user interface 230. User interface 230 may provide a network operator with various options for creating policies and assigning policies to users.

Policy storage 235 may include operator created policies. Policies may include static attributes, applicability conditions and action rules. In the example of a subscriber usage metering policy node, policies may include static usage management policy attributes, applicability rules, rating rules, and threshold rules. An exemplary usage management policy will be described in greater detail below with respect to FIG. 3.

Scanner 240 may include hardware and/or executable instructions on a machine-readable storage medium configured to generate rule objects from a policy. Scanner 240 may generate rule objects on system startup or during a rule version change. Scanner 240 may generate policy selection tables based on the applicability condition of each policy. Scanner 240 may generate action rule tables based on the action rules included within a policy. Action rule tables may be specifically for implementing a policy and include only rules defined in a single policy. Alternatively, scanner 240 may add rules from a policy to general management action rule tables. For example, scanner 240 may add usage management policy threshold rules to session establishment action rule tables.

Rule object storage 245 may be any machine-readable medium capable of storing rule objects for use by rules engine 250. Accordingly, rule object storage 245 may include a machine-readable storage medium such as read-only memory (ROM), random-access memory (RAM), magnetic disk storage media, optical storage media, flash-memory devices, and/or similar storage media. As will be described in further detail below with respect to FIG. 4, rule storage 245 may store definitions of numerous rule objects. Rule object storage 245 may include a cache for storing rule objects that are used frequently.

Rules engine 250 may include hardware and/or executable instructions on a machine-readable storage medium configured to evaluate a rule table and return a result set. As will be described in further detail below regarding FIG. 4, a rule table may include one or more rules. Each rule may include conditions and actions. Rules engine 250 may evaluate the conditions for each rule and, if all conditions of a rule are true, add the actions to a result set. Conditions may be based on context information provided by context information module 220 and/or system parameters. Actions may include a rule object that may be added to another rule table or a policy node action. Once rules engine 250 has evaluated each rule in a rule table, the result set may be passed to either policy selector 255 and/or action manager 260. Rules engine 250 may be used to perform other tasks within network policy node 136, and each task may be allocated an actual or virtual instance of rules engine 250.

Policy selector 255 may select an appropriate policy from a set of applicable policies. Policy selector 255 may base the selection on a priority of the applicable policies and/or consumption of a policy. For example, policy selector 255 may choose between applicable usage management policies based on the policy with the highest priority. A usage management policy for pre-paid data may have a higher priority than a usage management policy for overage data so that the usage management policy for pre-paid data is used first. In various exemplary embodiments, policy selector 255 may select a lower priority policy if an attribute of the higher priority policy has been consumed. For example, policy selector 255 may select an overage policy if all applicable pre-paid policy quotas have been used. Policy selector 255 may add a rule object corresponding to the selected policy to rule object storage 245 or indicate that such a rule object is now active. Rules engine 250 may immediately evaluate the selected rule object.

Action manager 260 may perform policy node actions included in the result set. Policy node actions for a usage management policy may include session actions and/or flow actions. Session actions may include: setting an access point name (APN) bitrate, setting primary bearer properties, creating or modifying charging and/or QoS rules, sending a notification via email, SMS, or other systems, sending session commands, setting a QoS class, and changing an Allocation Retention Priority (ARP), and other actions for session level management. Flow actions may include: sending a notification via email, SMS, or other systems, setting a rating factor for a bearer, setting a metering method, overriding a PCC rule bandwidth, setting an ARP, setting a service identifier, or any other action for flow level management. Action manager 260 may generate or update QoS and/or PCC rules to provide the subscriber with correct service according to the policy. Action manager 260 may also update context information storage 225, SPR 138, or other stored data. Action manager 260 may use message handler 220 to forward updated rules to network components such as SGW 132 and PGW 134.

FIG. 3 illustrates an exemplary usage management policy 300. In various exemplary embodiments, the usage management policy 300 may be a metering policy or a metering limit. Although a usage management policy is shown, policies may be created for a variety of network management scenarios such as, for example, network resource management, network security, and network traffic management.

Usage management policy 300 may include attributes 310, applicability rules 320, rating rules 330, and threshold rules 340. Policy 300 may be created or modified by a network operator using user interface 230.

Attributes 310 may include static properties of the policy set when the policy is created. As an example, policy 300 may be a usage management policy and attributes 310 may include: name 311, policy type 312, priority 313, quota type 314, quota 315, recurrence 316, validity period 317, and Sy management 318. Name 311 may be a unique name used to refer to a policy. A usage management policy name may correspond to a plan name or service option. Policy type 312 may indicate the type of policy. Policy types may include, for example, managed usage management policies, virtual usage management policies, unlimited usage management policies, and controlled overage usage management policies. Priority 313 may be a rating of the priority of the policy as compared to other policies. Priority 313 may be used by policy selector 255 to select a policy when there are multiple applicable policies. Each policy may be assigned a unique priority 313 to prevent conflicts. Quota type 314 may indicate a counter that is measured for a usage management policy. Quota types may include uplink volume, downlink volume, total volume, monetary value, time, or other measurements of network usage. Quota 315 may indicate a value of usage for a subscriber counter corresponding to quota type 314 that is allocated for a subscriber. If the subscriber's usage counter value exceeds quota 315, policy 300 may be exhausted and network policy node 136 may change policies or take other network management actions. Recurrence 316 may indicate how often a policy resets. Exemplary periods for recurrence 316 include daily, weekly, monthly, etc. Recurrence 316 may also indicate no recurrence, in which case validity period 317 may be included to indicate when the policy expires. Sy management 318 may indicate whether the policy is managed by the policy node 136 or another network node which communicates via an Sy interface.

Applicability rules 320 may include one or more rules for determining whether the policy 300 applies in a context. An applicability rule may include an applicability condition 322 and an applicability action 324. An applicability condition may include any condition based on context information that can be logically evaluated to determine whether the policy is applicable. Applicability conditions may vary depending upon the type of policy being selected. As an example of a usage management policy, the applicability condition of rule 326 may indicate that the rule is applicable when the access type is 4G. Other subscriber and user equipment characteristics may be useful for creating applicability conditions. As another example, an applicability condition for a network management policy may use subscriber or network node characteristics, or time of day. Applicability action 324 may include designating the policy as an applicable policy, for example, by adding the policy name 311 to a result list of applicable policies or setting the active policy to the policy name 311.

Rating rules 330 may be dynamic attributes for determining a rating factor used to measure usage for policy 300. Rating rules 330 may include one or more rating rules, each rule including conditions 332 and actions 334. As an example, a rating factor may be based on the network location of a user device. Exemplary rating rules 336, 337, and 338 may illustrate such a rating policy. Rating rule 336 may indicate that when user device 110 is connected to a local network, data traffic has a rating of 100. Rating rule 337 may indicate that when user device 110 is roaming, data traffic has a rating of 200. Rating rule 338 may indicate that when user device 110 is roaming internationally, data traffic has a rating of 300. Policy node 136 or PGW 134 may multiply raw usage amounts by the rating factor before adding the usage to a counter for comparison with quota 315. While the exemplary rules have been simplified, it should be understood that a policy 300 may include multiple rating rules with additional conditions such as, for example, time of day, destination location, guaranteed bandwidth, subscriber properties or any other factor influencing a network service. Actions 336 may include an action to set the rating factor, but may include additional actions such as, for example, sending a message to the user device indicating the rating factor. If no rating rules 330 are configured for a policy, a default rating factor of 1 may be used.

Threshold rules 340 may be dynamic attributes for determining actions by comparing a system parameter to a quota 315. Threshold rules 340 may include one or more threshold rules, each rule including conditions 342 and actions 344. Conditions 342 may include implicit conditions based on a percentage of a quota. For example, threshold rules for a usage management policy may be based on a system parameter of subscriber quota usage. Other types of policies may include threshold rules based on system parameters such as, for example, network congestion, available bandwidth, number of sessions, or other measurements of subscriber network 100. Conditions 342 may also include explicit conditions based on, for example, subscriber preferences. Threshold rules 340 may be generated and evaluated in order of the threshold percentage of the implicit conditions. Actions 344 may broadly include session actions and flow actions. Actions 344 may also be broadly classified as notification, modification, or termination. Exemplary threshold rules 346, 347, 348, and 349 may illustrate a possible set of threshold rules. Threshold rule 346 may indicate that network policy node 136 should terminate service when the subscriber's usage has reached 100% of the quota. Threshold rule 347 may indicate that network policy node 136 should downgrade the subscriber's service, for example, by limiting bandwidth, when the subscriber has reached 90% of the quota. Threshold rule 348 may indicate that network policy node 136 should notify the subscriber when the subscriber has reached 50% of the quota. Threshold rule 349 may indicate that network policy node 136 should notify the subscriber when the subscriber is at 0% of the quota, that is, the policy is new or has been reset. It should be apparent that threshold rules 340 may be configured with additional or more complicated rules to meet the demands of subscribers and providers.

FIG. 4 illustrates an exemplary rule table 400. In the example shown, exemplary rule table 400 may be a policy selection rule table used to determine applicable policies. Other types of rules tables may include similar features. Rule table 400 may be a rule object stored in rule object storage 245. Rule table 400 may include one or more rules 440*a-n*, each rule including a rule condition 420 and rule action 430.

Rules 440*a-n* are provided as examples of possible rules in a policy selection rule table. The rules 440 may be generated by extracting the applicability condition from a set of policies and adding additional conditions such as the condition that the policy is assigned to the subscriber. Each rule 440 may include different conditions 420, but the conditions may overlap. The rule action 430 for each rule 440 may be to set the policy name as the active policy or to include the policy name in a result set. Rule 440*a* may be applicable when a subscriber establishes 4G connection. Rule 440*b* may be applicable when a subscriber connects using an iPhone. Rule 440*c* may be applicable when the subscriber connects using an Android device. Rule 440*d* may be applicable when the subscriber establishes a connection through a DSL modem. Rule 440*e* may be applicable when the subscriber connects with a WAP device. Rule 440*f* may be applicable when a subscriber connects with any device. Rule 440*g* may also be applicable when the subscriber connects with any device. Rule 440*h* may indicate that additional rules may be included in rule table 400.

The rules provided in rule table 400 may be used to select a set of applicable policies. As an example, according to the exemplary rules described above, if a user establishes a 4G connection using an iPhone, rules 440*a*, 440*b*, 440*f*, and 440*g* may all be applicable. As described above, policy selector 255 may choose a single rule. Alternatively, priorities and/or consumption may be included as additional conditions of the rules so that the rule table produces only a single policy.

Figure 5:
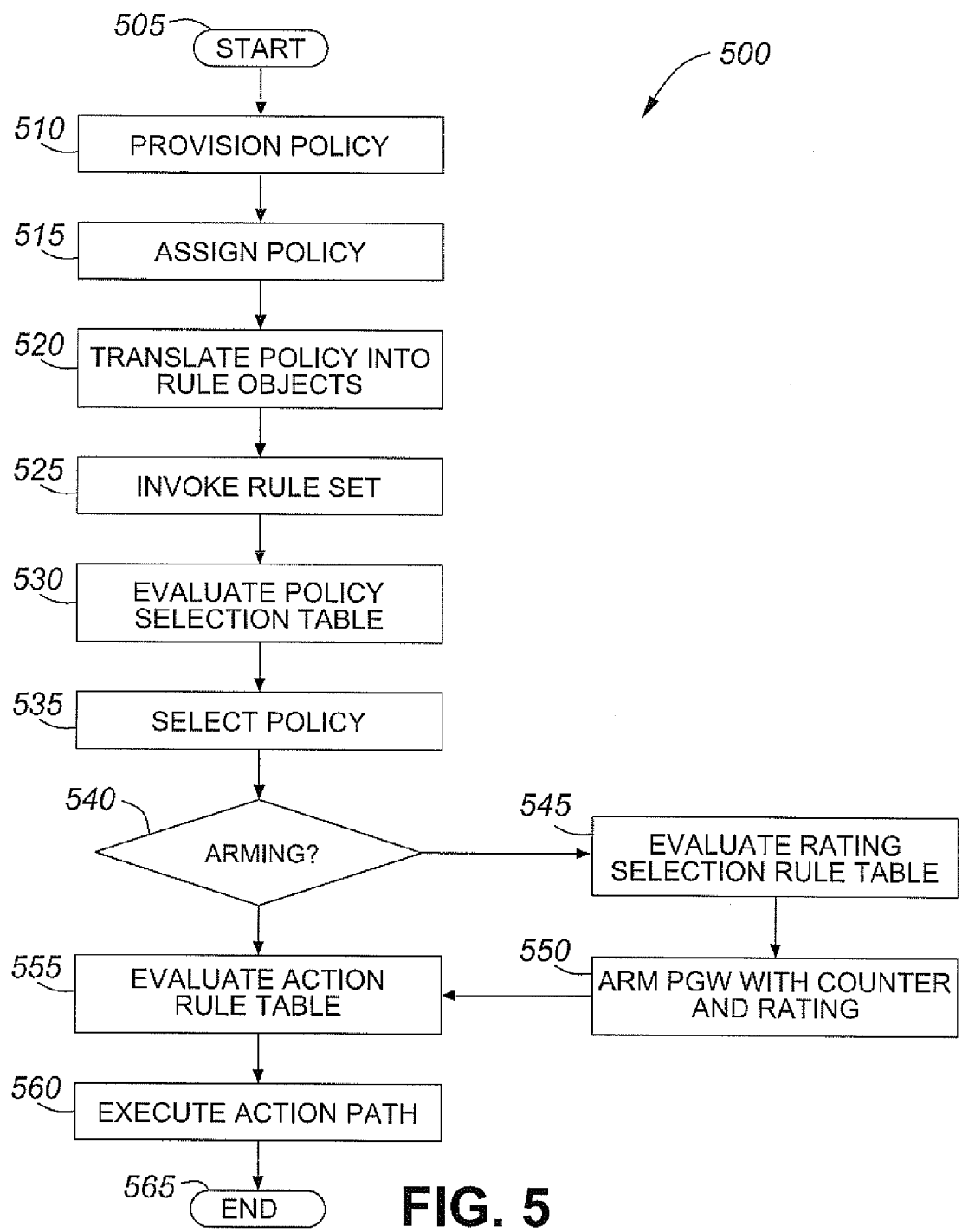
FIG. 5 illustrates a flowchart showing an exemplary method performed by a network policy node.

FIG. 5 illustrates a flowchart showing an exemplary method performed by a network policy node 136. The method 500 may be performed by the various components of network policy node 136 such as message handler 220, scanner 240, rules engine 250, policy selector 255, and action manager 260. The method 500 may begin in step 505 and proceed to step 510.

In step 510, a system operator may provision one or more policies. The system operator may use user interface 230 to select both static and dynamic attributes of the policy. The system operator may provision policies in the abstract without particular reference to specific subscribers. As each policy is provisioned, policy attributes may be stored in policy storage 235. The method may then proceed to step 515.

In step 515, a system operator may assign one or more policies to each subscriber. Policies may be manually selected by an operator and assigned to the subscriber. Alternatively, policy assignment may be based on subscriber profiles such that policies are automatically assigned when a subscriber selects various service options. For example, a usage management policy may be created for each service plan or option, and the policy may be assigned when a subscriber subscribes to the plan or adds the option. The method may then proceed to step 520.

In step 520, scanner 240 may translate stored policies into rule objects. Scanner 240 may generate a selection table for a set of policies or a rule set. Scanner 240 may extract the applicability conditions for each policy and create a rule with the applicability condition as a condition of the rule. Scanner 240 may also add additional conditions to the selection table rule such as, for example, the condition that the policy has been assigned to the subscriber. The policy selection table may be stored as a rule object in rule object storage 245. Scanner 240 may also generate one or more action rule tables for each policy based on dynamic attributes of the policy. For example, scanner 240 may generate an action rule table for each set of rating rules 230 and threshold rules 240 within each usage management policy. Each action rule table may be stored in rule object storage 245. The method may then proceed to step 525.

In step 525, network policy node 136 may invoke a rule set such as a set of policies, for example, the set of usage management policies. A rule set may be invoked whenever a policy decision is necessary. For example, a usage management policy rule set may be invoked whenever a subscriber establishes a new session or updates an existing session. Invocation of a rule set may be an action resulting from another policy decision. The method may then proceed to step 530.

In step 530, rules engine 250 may evaluate a policy selection table to determine which policies are applicable. Rules engine 250 may evaluate the conditions of each rule and, if the conditions evaluate to true, add the action of the rule to the result set. Rules engine 250 may access context information storage 225 to evaluate the conditions of each rule. Alternatively, rule engine 250 may query another node using message handler 220 to evaluate the conditions of each rule. The actions for a policy selection table may include policy names, so evaluation of the policy selection table may result in a set of applicable policies. The method may then proceed to step 535.

In step 535, policy selector 255 may determine which applicable policy to implement. Policy selector 255 may simply select the policy with the highest priority. Alternatively, policy selector 255 may perform additional logical tests based on context information storage 225. Once policy selector 255 chooses a policy, the method may proceed to step 540.

In step 540, network policy node 136 may determine whether to arm another node with rating information. If evaluation of the policy selection table has resulted in a change of policy or was based on another event that may influence rating, method 500 may proceed to step 545. Otherwise, method 500 may proceed to step 555.

In step 545, rule engine 250 may evaluate a rating selection rule table associated with the selected policy. Rule engine 250 may retrieve the rating selection rule table object from rule object storage 245 and access context information storage 225 to evaluate the conditions of the rating selection rule table. When rule engine 250 evaluates a condition as true, rule engine 250 may pass the rating factor to action manager 260. In step 550, action manager 260 may use message handler 220 to arm another node, for example PGW 134, with the rating information. Message hander 220 may generate a message requesting the other node to monitor usage and multiply it by the rating factor before reporting the usage to network policy node 136. Alternatively, network policy node 136 may store the rating factor and multiply reported usage by the rating factor when it receives usage reports. The method 500 may then proceed to step 555.

In step 555, rule engine 250 may evaluate an action rule table such as a threshold rule table associated with the selected policy. Rule engine 250 may retrieve the threshold rule table object from rule object storage 245 and access context information storage 225 to evaluate the conditions of the threshold rule table. When rule engine 250 evaluates a condition as true, rule engine 250 may pass the action path to action manager 260. In step 560, action manager 260 may execute the action path. The method may then proceed to step 565, where the method ends.

According to the foregoing, various exemplary embodiments provide for a network policy node capable of making efficient network policy decisions. In particular, by converting policies to rule objects, a rule engine may efficiently select applicable policies and evaluate policy rules to manage a subscriber network.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method performed by a network policy node, the method comprising:
   translating a policy into a plurality of rule objects, the policy including an applicability condition and one or more action rules;
   generating a selection rule table based on the applicability condition of one or more policies;
   determining a set of applicable policies by evaluating the selection rule table using a rules engine to compare the applicability conditions and context information;
   generating an action rule table from the one or more action rules of the set of applicable policies, an action rule including an action rule condition and an action path defining an action to be executed by the network policy node; and
   selecting an action path by evaluating the action rule table using the rules engine to compare the action rule condition and the context information.

2. The method of claim 1, wherein the one or more action rules include one or more threshold rules, and the step of selecting an action path comprises:
   generating a threshold rule table based on the one or more threshold rules; and
   selecting an action path by evaluating the threshold rule table using the rules engine to compare a threshold condition and a system parameter.

3. The method of claim 1, wherein the one or more action rules include one or more rating rules, and the method further comprises:
generating a rating selection table based on the one or more rating rules;
selecting a rating factor by evaluating the rating selection table using the rules engine; and
multiplying an input value by the rating factor.

4. The method of claim 3, wherein the policy is a usage management policy, the method further comprising:
receiving a usage report including a subscriber's usage of a network, wherein the subscriber's usage is the input value;
determining a system parameter based on the input value;
generating a threshold rule table based on one or more threshold rules of the applicable policy; and
selecting an action path by evaluating the threshold rule table using the rules engine to compare a threshold condition and the system parameter.

5. The method of claim 1, further comprising selecting a policy from among the applicable policies according to a priority of the applicable policies.

6. The method of claim 1, further comprising: assigning at least one policy to a subscriber, wherein the step of determining a set of applicable policies includes determining whether a policy has been assigned to a subscriber.

7. The method of claim 1, wherein the one or more policies is one or more usage management policies and one or more action paths include session actions and flow actions.

8. A network policy node comprising:
a scanner configured to:
generate rules objects based on one or more policies, and
generate rule tables including one or more rule objects;
a context information storage configured to store context information;
a rules engine configured to:
evaluate a selection rule table based on the context information and return a set of applicable policies, and
evaluate an action rule table based on the context information and return an action path defining an action to be executed by the network policy node, wherein the action rule table is generated based on the set of applicable policies.

9. The network policy node of claim 8, wherein the one or more policies include a priority, and the network policy node further comprises a policy selector configured to select a policy from among the applicable policies based on the priority.

10. The network policy node of claim 8, further comprising a rule object memory configured to maintain an active set of rule objects.

11. The network policy node of claim 8, further comprising:
a first interface configured to receive network context information; and
a second interface configured to send and receive subscriber context information.

12. The network policy node of claim 8, wherein the policies are usage management policies including applicability rules, a quota, rating selection rules, and threshold rules.

13. The network policy node of claim 12, wherein the scanner is further configured to generate a rating selection table and the rules engine is further configured to evaluate the rating selection table to select a rating factor.

14. The network policy node of claim 12, further comprising an action manager configured to:
arm another network node with usage reporting requirements; and
perform network management actions.

15. A tangible and non-transitory machine-readable storage medium encoded with instructions thereon for execution by a network element of a telecommunication network, wherein said tangible and non-transitory machine-readable storage medium comprising:
instructions for translating a policy into a plurality of rule objects, the policy including an applicability condition and one or more action rules;
instructions for generating a selection rule table based on the applicability condition of one or more policies;
instructions for determining a set of applicable policies by evaluating the selection rule table using a rules engine to compare the applicability conditions and context information;
instructions for generating an action rule table from the one or more action rules of the set of applicable policies, an action rule including an action rule condition and an action path defining an action to be executed by the network policy node; and
instructions for selecting an action path by evaluating the action rule table using the rules engine to compare the action rule condition and the context information.

16. The tangible and non-transitory machine-readable storage medium of claim 15, wherein the one or more action rules include one or more threshold rules, and the instructions for selecting an action path comprise:
instructions for generating a threshold rule table based on the one or more threshold rules; and
instructions for selecting an action path by evaluating the threshold rule table using the rules engine to compare a threshold condition and a system parameter.

17. The tangible and non-transitory machine-readable storage medium of claim 15, wherein the one or more action rules include one or more rating rules, and the tangible and non-transitory machine-readable storage medium further comprises:
instructions for generating a rating selection table based on the one or more rating rules;
instructions for selecting a rating factor by evaluating the rating selection table using the rules engine; and
instructions for multiplying an input value by the rating factor.

18. The tangible and non-transitory machine-readable storage medium of claim 17, wherein the policy is a usage management policy, the tangible and non-transitory machine-readable storage medium further comprising:
instructions for receiving a usage report including a subscriber's usage of a network, wherein the subscriber's usage is the input value;
instructions for determining a system parameter based on the input value;
instructions for generating a threshold rule table based on one or more threshold rules of the applicable policy; and
instructions for selecting an action path by evaluating the threshold rule table using the rules engine to compare a threshold condition and the system parameter.

19. The tangible and non-transitory machine-readable storage medium of claim 15, further comprising instructions for selecting a policy from among the applicable policies according to a priority of the applicable policies.

20. The tangible and non-transitory machine-readable storage medium of claim 15, further comprising instructions for assigning at least one policy to a subscriber, wherein the instructions for determining a set of applicable policies includes instructions for determining whether a policy has been assigned to a subscriber.

21. The tangible and non-transitory machine-readable storage medium of claim 15, wherein the one or more policies is one or more usage management policies and one or more action paths include session actions and flow actions.

* * * * *